United States Patent
Hahn-Carlson

(12) 
(10) Patent No.: US 6,571,149 B1
(45) Date of Patent: May 27, 2003

(54) SHIPMENT TRANSACTION SYSTEM AND METHOD

(75) Inventor: Dean W. Hahn-Carlson, St. Paul, MN (US)

(73) Assignee: U.S. Bancorp, Minneapolis, MN (US)

( * ) Notice: Subject to any disclaimer, the term of this patent is extended or adjusted under 35 U.S.C. 154(b) by 0 days.

(21) Appl. No.: 09/259,657

(22) Filed: Feb. 26, 1999

Related U.S. Application Data

(63) Continuation of application No. 08/748,243, filed on Nov. 12, 1996, now Pat. No. 5,910,896.

(51) Int. Cl.[7] .............................. G06F 7/00; G06F 17/60
(52) U.S. Cl. .......................... 700/216; 705/34; 705/39; 705/40
(58) Field of Search ................................. 700/213, 216; 705/26, 29, 30, 34, 35, 39, 40

(56) References Cited

U.S. PATENT DOCUMENTS

| | | |
|---|---|---|
| 4,114,027 A | 9/1978 | Slater et al. |
| 4,270,042 A | 5/1981 | Case |
| 4,305,059 A | 12/1981 | Benton |
| 4,412,287 A | 10/1983 | Braddock, III |
| 4,567,359 A | 1/1986 | Lockwood |
| 4,713,761 A | 12/1987 | Sharpe et al. |
| 4,725,719 A | 2/1988 | Oncken et al. |
| 4,750,119 A | 6/1988 | Cohen et al. |
| 4,799,156 A * | 1/1989 | Shavit et al. ............... 364/401 |
| 4,926,325 A | 5/1990 | Benton et al. |
| 4,949,272 A | 8/1990 | Vanourek et al. |
| 4,960,981 A | 10/1990 | Benton et al. |
| 5,008,827 A | 4/1991 | Sansone et al. |
| 5,025,372 A | 6/1991 | Burton et al. |
| 5,077,694 A | 12/1991 | Sansone et al. |
| 5,117,364 A | 5/1992 | Barns-Slavin et al. |
| 5,153,842 A | 10/1992 | Dlugos, Sr. et al. |
| 5,161,109 A | 11/1992 | Keating et al. |
| 5,168,444 A | 12/1992 | Cukor et al. |
| 5,175,416 A | 12/1992 | Mansvelt et al. |
| 5,208,446 A | 5/1993 | Martinez |
| 5,218,188 A | 6/1993 | Hanson |
| 5,220,501 A | 6/1993 | Lawlor et al. |
| 5,222,018 A | 6/1993 | Sharpe et al. |
| 5,231,569 A | 7/1993 | Myatt et al. |
| 5,293,310 A | 3/1994 | Carroll et al. |
| 5,334,823 A | 8/1994 | Noblett, Jr. et al. |
| 5,334,824 A | 8/1994 | Martinez |
| 5,337,246 A | 8/1994 | Carroll et al. |
| 5,357,563 A | 10/1994 | Hamilton et al. |
| 5,393,963 A | 2/1995 | Thomas et al. |
| 5,426,281 A | 6/1995 | Abecassis |
| 5,440,634 A | 8/1995 | Jones et al. |
| 5,666,493 A * | 9/1997 | Wojcik et al. ................ 705/26 |
| 5,842,178 A * | 11/1998 | Giovannoli ................... 705/26 |

\* cited by examiner

*Primary Examiner*—Paul P. Gordon

(57) ABSTRACT

A computer processing system for a shipment transaction involving a shipper and a carrier. The system is particularly suited to efficiently automate the payment of a shipment transaction and to efficiently provide access to relevant shipment information. The system includes a shipper processor which receives purchase order information and assists in generating a bill of lading for the transaction. A shipper access terminal interfaces between the shipper processor and a central processor arrangement to control the quantity, quality, and timeliness of information transferred to the central processor arrangement. The central processor arrangement stores selective shipment information and generates reports regarding the transactions. A carrier processor provides proof of delivery to the central processor arrangement. The central processor communicates with one or more financial institutions so that the carrier is paid and shipper billed for the relevant transaction.

21 Claims, 9 Drawing Sheets

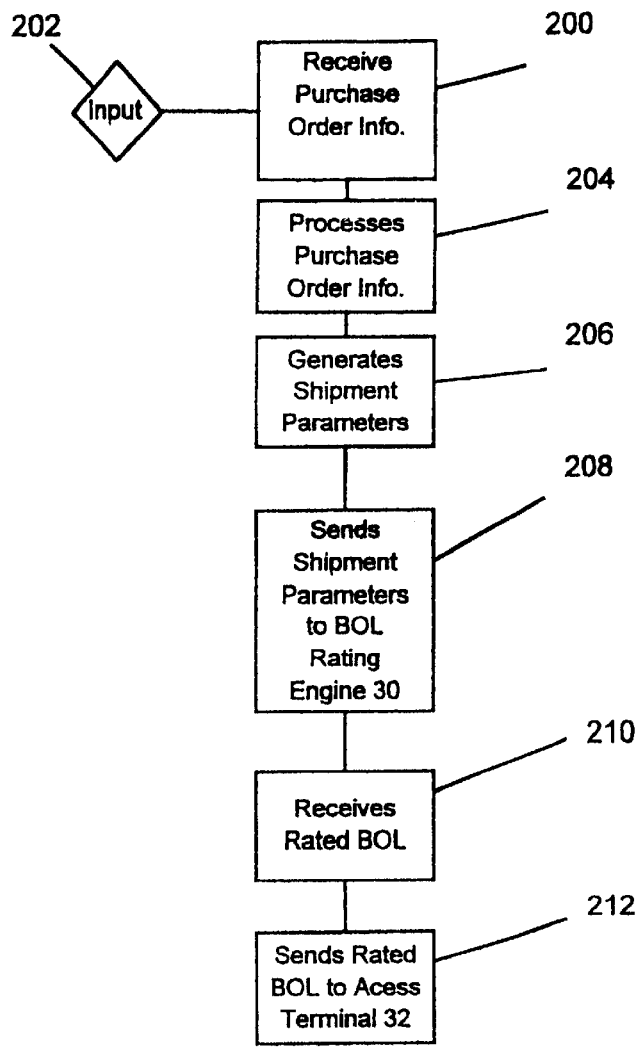
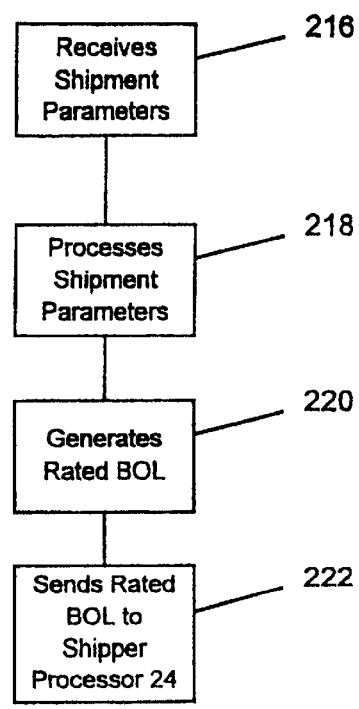
FIGURE 2
FIGURE 2a

SHIPMENT TRANSACTION SYSTEM AND METHOD

This is a Continuation of application Ser. No. 08/748,243 filed Nov. 12, 1996 now U.S. Pat. No. 5,910,896, which application is incorporated herein by reference.

FIELD OF THE INVENTION

The present invention relates to a computer processing system for a shipment transaction involving a shipper and a carrier.

BACKGROUND OF THE INVENTION

Processing shipment transactions between a shipper and a carrier has been a manually intensive effort and has experienced little change. Generally, the shipment transaction process involves a goods transport path and a payment process path. The goods transport path typically starts when a carrier picks up the goods at the shipper's warehouse dock. The carrier receives a copy of a transaction document, sometimes referred to as a bill of lading (BOL), from the shipper. This type of transaction document includes information associated with the shipment transaction which is used by the shipper and carrier to track the shipment of goods. The carrier transports the goods to the receiver where the receiver signs a copy of the BOL to verify receipt of the goods. After the carrier has delivered the goods to the receiver, the carrier also submits the receiver's signed copy of the BOL to the carrier's headquarters.

The payment process path starts when the carrier picks up the goods from the shipper. The carrier sends a copy of the BOL to the carrier's headquarters for processing. The carrier headquarters rates the BOL. Rating involves determining the shipment cost which takes into the account various shipment parameters such as the size, weight, type of material, and destination of the shipment. The carrier creates an invoice, sets up an accounts receivable, and sends the invoice to the shipper's accounts payable department. The shipper, either internally or via a third party, audits the invoice to ensure the final cost is proper.

One of the more burdensome aspects of the traditional process involves reaching agreement as to the final cost. If there is a dispute as to final cost, the shipper and carrier begin a burdensome and sometimes lengthy negotiation process in an attempt to settle the dispute. If the dispute is resolved, the shipper sets up an accounts payable for the transaction. The shipper will then send payment to the carrier and clear the accounts payable. Traditionally, the process for paying the carrier and clearing the accounts payable involves several manually intensive steps. Upon receipt of payment, the carrier clears the accounts receivable. Traditionally, the process for clearing an accounts receivable includes the carrier manually inputting final payment information into the accounts receivable system.

The traditional approach can lead to many disadvantages for a transaction between one shipper and one carrier. Typically, however, there are multiple carriers and shippers involved in multiple transactions, which makes the situation more complex, and that much more slow and inefficient. The process is manually intensive in that it relies on the hard copy of the BOL for proof of delivery and payment, resulting in a series of repetitive and time consuming steps. Also, each BOL is often rated multiple times by multiple parties creating excessive redundancy.

Traditional shipment transaction systems are also highly susceptible to billing errors and fraud. For example, there is no connection between the delivery of goods and when the shipper is billed for delivery. This may result in double billing, no billing at all, or overbilling the shipper for freight delivery charges. Also, auditing error may occur which results in incorrect billing or payment. In addition, the carrier waits a disproportionately long time for payment while the invoice is being audited and/or disputed. For example, traditionally, a delivery takes about five days whereas payment takes about thirty days. This unnecessary delay adversely affects the carrier's working capital resources.

Additional costs arise as a result of the existing inefficiencies. Many of the costs are individually small, but very large in the aggregate. For example, the carrier incurs administrative costs including: the cost to create and deliver the initial invoice, costs of resolving billing disputes, costs of providing a signed copy of the BOL to the shipper, and costs of posting accounts receivable. The shipper incurs similar administrative costs.

An additional disadvantage involves the inability to obtain immediate information regarding a shipment. Since the process is largely conducted manually, it is very difficult to track a shipment. To learn of the status of shipment or payment, there are various manual steps involved. For example, if the shipper wants to know if the carrier delivered the goods and if the payment has been made, the shipper must call the carrier and the appropriate financial institution.

There have been numerous attempts to improve the existing shipment and payment process. Some improvements have been made to each separate step of completing a shipment transaction, but the entire method remains relatively unchanged. For example, freight agents are used by shippers to schedule shipments and to process the invoice from the carrier. Also, third party service providers have taken over the role of managing the shipper's accounts payable department.

Another attempt to improve this burdensome transaction process involves the use of the Internet. Carriers have offered Internet access to their shipment information. Shippers access the carrier's Internet address and find out the immediate status of the shipment. A disadvantage of this system arises when, as in many applications, the shipper is using multiple carriers. In this typical situation, the shipper separately accesses the address of each carrier in order to find out the status of each shipment. This is unduly time consuming.

Another disadvantage of traditional systems is that the shipper's reference number and the carrier's reference number are not compatible. The carrier maintains the shipment data, so the shipper accesses the data using the carrier's reference number rather than the shipper's reference number. The shipper and carrier track each shipment using multiple reference numbers.

These various attempts to improve the overall process have fallen short of providing a convenient and cost effective system to process a shipment transaction.

SUMMARY OF THE INVENTION

According to one application, the present invention is directed to a shipment transaction system for processing transaction information related to goods shipped from a shipper by a carrier. The system comprises a means for accepting shipment information at the shipper's premises. The system provides a data processing means at the shipper's premises, responsive to the shipment information, arranged and configured to generate a set of transaction information. The transaction information includes information associated with the carrier and the time at which the shipment is initiated at the shipper's premises. The system uses a central processor arrangement, responsive to the transaction information, and located remote from the shipper's premises, for processing selective information regarding the shipment. The system provides means for informing the central processor arrangement of delivery of goods by the carrier. The central processor arrangement, responsive to informing means, using the transaction information to audit the shipment transaction and payment thereof.

The above summary of the present invention is not intended to describe each illustrated embodiment, or every illustrated implementation, of the present invention. This is the purpose of the figures and of the detailed description that follows.

BRIEF DESCRIPTION OF THE DRAWINGS

Other aspects and advantages of the invention will become apparent upon reading the following detailed description and upon reference to the drawings in which:

FIG. 2 is a block diagram illustrating an example flowchart for programming the shipper processor 24 of FIG. 1 according to the present invention;

FIG. 2a is a block diagram illustrating an example flowchart for programming the BOL rating engine 30 of FIG. 1 according to the present invention;

Figure 1:
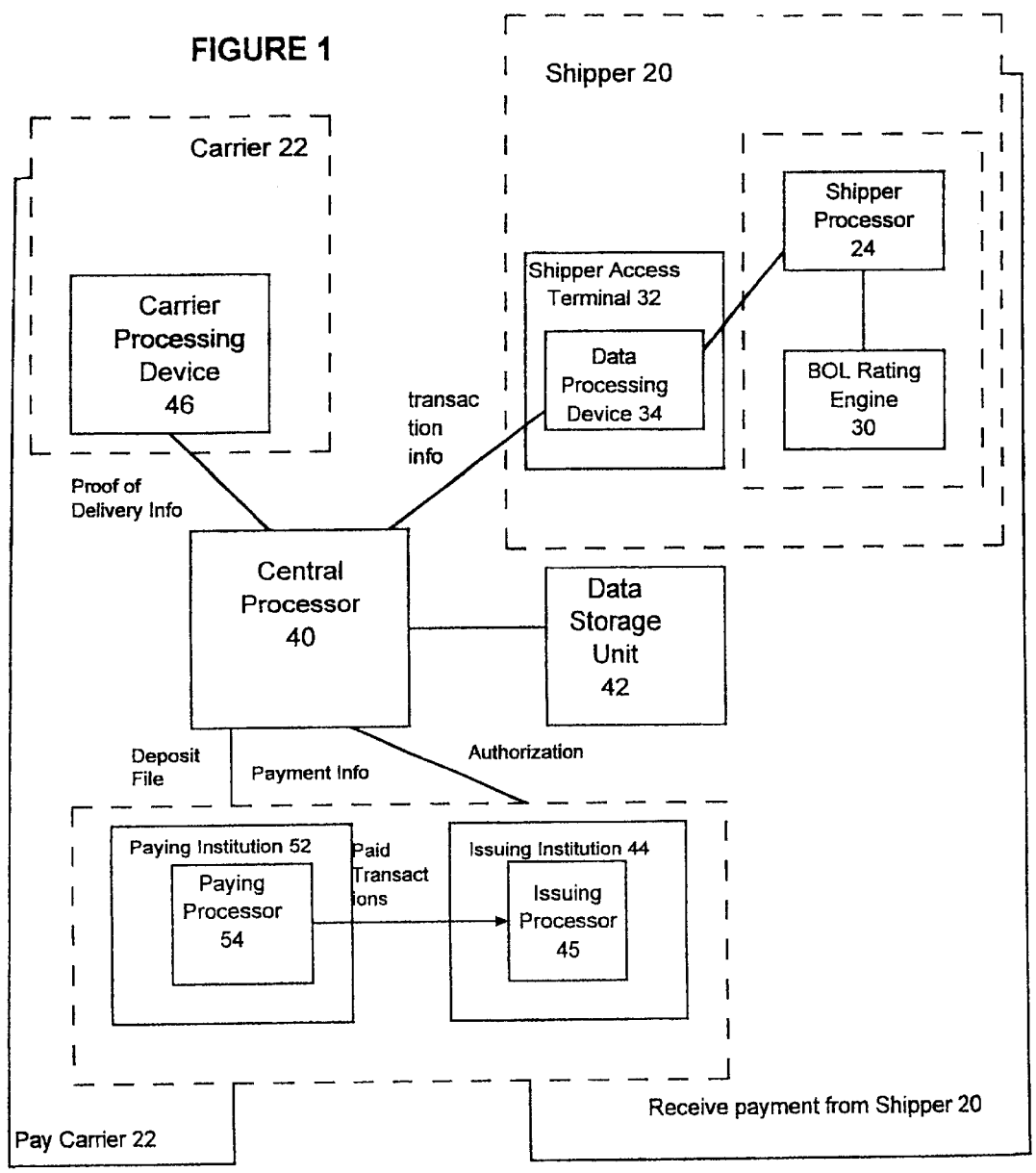
FIG. 1 is a block diagram illustrating a specific embodiment which incorporates principles of the present invention.

While the invention is susceptible to various modifications and alternative forms, specific embodiments thereof have been shown by way of example in the drawings and will herein be described in detail. It should be understood, however, that it is not intended to limit the invention to the particular forms disclosed. On the contrary, the intention is to cover all modifications, equivalents, and alternatives falling within the spirit and scope of the invention as defined by the appended claims.

DETAILED DESCRIPTION OF THE INVENTION

The present invention is generally applicable to a computer processing system for a shipment transaction involving a shipper and a carrier. The present invention has been found to be particularly advantageous for a system which efficiently automates the payment of a shipment transaction and efficiently provides access to shipment information.

The present invention is generally directed to a system which automates the shipment transaction process to thereby provide a convenient transaction protocol between the delivery, billing, and payment aspects of the transaction.

As shown in FIG. 1, a shipper processor 24 initiates the shipment transaction by acting in conjunction with a BOL rating engine 30 to generate a rated BOL. The shipper processor send the rated BOL to a data processing device 34 of a shipper access terminal 32. The data processing device 34 generates transaction information and sends the transaction information to a central processor 40. The central processor 40 identifies and centrally tracks the transaction information. A carrier processing device 46 receives proof of delivery information and sends this information to the central processor 40. The central processor 40 processes and stores all pertinent shipment information in a data storage unit 42 and allows immediate access to this information by the shipper 20, the carrier 22, and other authorized users. This reduces the administrative costs of the shipper 20 and the carrier 22. The central processor 40 interfaces with an improved payment system including an issuing institution 44 and a paying institution 52. An issuing processor 45 of the issuing institution 44, maintains a credit account for the shipper 20 and debits the shipper's account for the cost of the shipment. A paying processor 54 of the paying institution 52 tenders payment to the carrier 24.

FIG. 2 is a block diagram illustrating an example flowchart for programming the shipper processor 24 of FIG. 1 according to the present invention. According to this example flowchart, the shipper processor 24 receives 200 an input of relevant purchase order information for storage and processing using an adequate input device 202. Using a conventional desktop PC for example, a keyboard and mouse are adequate input devices. Using a more complex computer arrangement, a digital retrieving device, such as an information scanner, is used to offset some of the labor associated with this inputting effort.

The shipper processor 24 processes 204 the purchase order information including referencing inventory control and customer information systems to generate 206 shipment parameters. In a particular application, the shipment parameters include the identity of the carrier, identity of the receiver, the number of units, the weight of the shipment, the destination of the shipment, the date of shipment, and the estimated date of delivery. The shipper processor 24 is located at the shipper's premises so that the shipper processor 24 receives accurate information resulting in further reliability and efficiency of the system.

The shipper processor 24 electronically sends 208 the shipment parameters to the BOL rating engine 30. The transmission is accomplished conventionally. The BOL rating engine 30 of the illustrated embodiment of FIG. 1, is designed to suit the needs of the particular shipper, the type of goods shipped, and to provide an interface to the shipper processor 24. Conventionally, BOL rating engines, which are in use today, are implemented using a computer processing device such as a stand-alone personal computer, a personal computer connected to a network, or a conventional mainframe.

FIG. 2a is a block diagram illustrating an example flowchart for programming the BOL Rating Engine 30 of FIG. 1 according to the present invention. The BOL rating engine receives 216 the shipment parameters and processes 218 the shipment parameters. The BOL Rating Engine 30 generates 220 a rated BOL. The BOL rating engine 30 is programmed to an agreed upon rate structure by the shipper 20 and carrier 22. As a result, the BOL rating engine 30 produces consistently rated BOL's. This has the further advantage that the shipper 20 and the carrier 22 do not have to audit the engine often. Existing systems require frequent auditing of the results of the BOL rating engine. With no post audit adjustments, the payment to the carrier 22 is definite.

The BOL rating engine 30 sends 222 the rated BOL to the shipper processor 24. In a particular application, the BOL rating engine 30 is included in the shipper processor 24. The shipper processor 24 performs the rating function of the BOL rating engine 30 so that there is no need to send the shipment parameters to an external BOL rating engine. The shipment parameters are processed and a rated BOL is generated solely by the shipper processor 24.

Another advantage associated with the process in which a rated BOL is produced is that only one BOL rating engine 30 is needed for the entire shipment transaction system. This saves duplicate efforts by the carrier 22 and ensures exact payment. A significant benefit of this illustrated embodiment of FIG. 1 is that the cost depicted on the BOL is the final cost of shipment. Therefore, the shipper 20 and carrier 22 will immediately know the final cost of shipment before the goods are delivered. The BOL rating engine 30 removes ambiguity from the shipment transaction payment process which significantly offsets time consuming payment disputes.

The shipper processor 24 receives 212 the rated BOL and sends 214 the rated BOL to a shipper access terminal 32 located at the shipper's premises. In an alternative embodiment, the BOL rating engine 30 is located off the shipper's premises so that the shipper processor 24 can access the BOL rating engine 30 on an as-needed basis. One advantage is that one standardized BOL rating engine could be electronically linked to multiple shipper processors thereby reducing the cost to each individual shipper.

Figure 3:
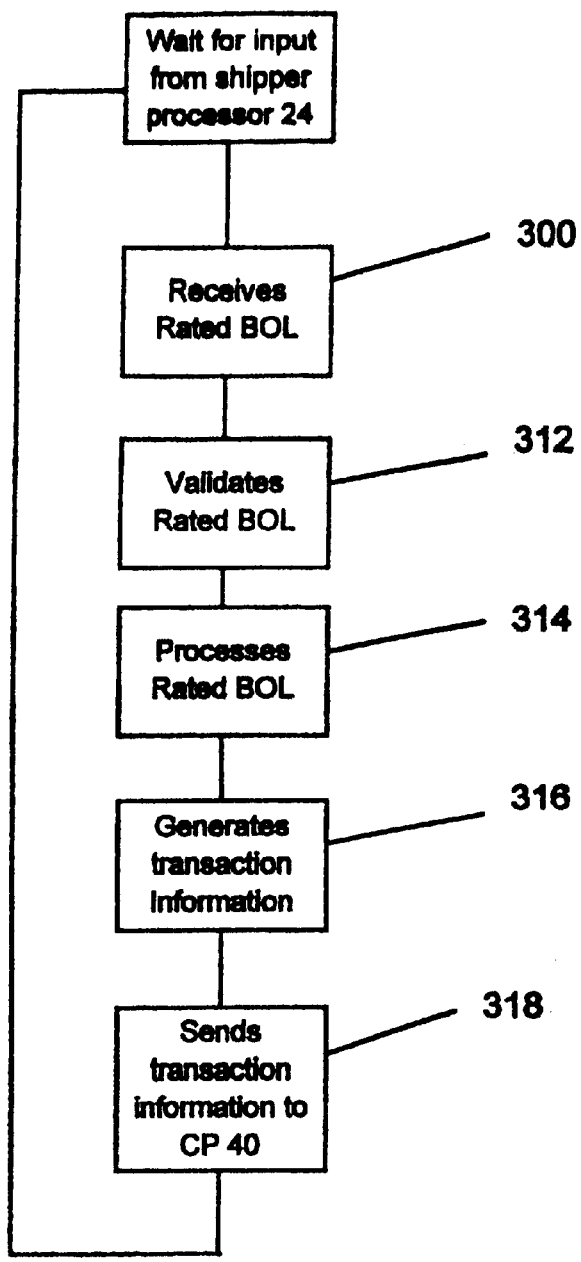
FIG. 3 is a block diagram illustrating an example flowchart for programming the data processing device 34 of FIG. 1 according to the present invention.

FIG. 3 is a block diagram illustrating an example flowchart for programming the data processing device 34 of FIG. 1 according to the present invention. The shipper access terminal 32 contains a data processing device 34 which receives 300 the rated BOL. The data processing device 34 validates 312 the rated BOL to ensure that the rated BOL contains data which is complete, error-free, and properly formatted. The data processing device 34 processes 312 the rated BOL and generates 316 a list of transaction information. The transaction information includes the information as seen in table 1 below. The columns in Table 1 represent the following: Data Element is the data that will reside in that particular element location, Length is the length of the data element; type is the type of data element which is either numeric or alpha-numeric, and Description simply describes the function of the data element if necessary.

TABLE 1

Transaction Information

| Data Element | Length | Type | DESCRIPTION |
| --- | --- | --- | --- |
| Shipper ID | 10 | N | Record ID |
| Dock ID | 3 | N | Record ID |
| Bill of Lading # | 15 | AN | Record ID |

TABLE 1-continued

Transaction Information

| Data Element | Length | Type | DESCRIPTION |
| --- | --- | --- | --- |
| Ship Date | 8 | N | Record ID, reporting |
| SCAC | 4 | A | Standard Carrier Alpha Code, a national standardized carrier identification code. |
| Carrier Vendor Number | 10 | N | Alternate index, allows Shipper 20 to specify its vendor number for a given carrier 22 |
| Customer Number | 10 | N | Alternate index, allows shipper 20 to specify it's customer number for a given receiver |
| Customer PO # | 15 | AN | Alternate index, reporting |
| Shipper Order # | 15 | AN | Alternate index |
| Vendor Order Number | 15 | AN | Reporting, alternate locator, carrier 22 PO associated with shipment |
| Shipper Name | 35 | AN | |
| Shipper Contact Person | 20 | A | |
| Shipper Phone # | 15 | AN | |
| Origin Designator | 10 | AN | |
| City | 20 | AN | |
| State | 2 | A | |
| ZIP Code | 9 | N | |
| Division Code | 2 | AN | |
| Reference B/L #1 | 15 | AN | Consolidated Shipments |
| Reference B/L #2 | 15 | AN | Consolidated Shipments |
| Reference B/L #3 | 15 | AN | Consolidated Shipments |
| Bill of Lading Type | 1 | AN | Reporting |
| Shipment Mode | 3 | AN | Less than Truck Load(LTL), Truck Load (TL), Rail (RAI), AIR |
| Inbound, Outbound Flag | 1 | AN | |
| Prepaid, Collect Flag | 1 | AN | |
| COD Flag | 1 | N | |
| COD Amount | 9.2 | N | |
| Shipment Value | 9.2 | N | |
| Driver Name | 20 | AN | |
| Trailer/Car # | 15 | AN | |
| Trailer/CarSeal# | 15 | AN | |
| Import, Export Flag | 1 | AN | |
| # Stops | 2 | N | |
| Stop off Charges | 7.2 | N | |
| Rated Freight Charges | 9.2 | N | |
| Cube Dimensions | 5 | N | |
| Shipment "as weight~ | 7.2 | N | |
| Accessorial Charges | 7.2 | N | |
| Total Freight Chgs | 9.2 | N | |
| Destination Name | 25 | AN | |
| Destination City | 20 | AN | |
| Destination State | 2 | A | |
| Destination Zip Code | 9 | N | |
| Destination Area Code | 3 | N | |
| Destination Prefix | 3 | N | |
| Destination Phone | 4 | N | |
| Mileage | 5 | N | |

The data processing device 34 sends the transaction information to a central processor 40. In one embodiment, the data processing device 34 is implemented using a conventional personal computer programmed to operate under the control of an operating system stored in the memory. These types of computer arrangements are not presently programmed to conventionally interface with a central processing center and a processing device located at a shipper's premises. One advantage of interfacing the central processor 40 with shipper access terminal 32 is that the shipper access terminal 32 can control the quantity, quality, and timing of information that is transmitted between the shipper processor 24 and the central processor 40. The access terminal 32 can also control the communication sessions between the shipper processor 24 and the central processor 40. The shipper access terminal 32 is designed so that the shipper 20 may directly access the transaction information. The shipper 20 will not be allowed to make changes to the transaction information, but is able to add additional information. This ensures the integrity of the transaction information. An additional advantage of the access terminal 32 is that the data processing device 34 can receive real-time information from the shipper processor 24 regarding the shipment transaction.

In an alternative embodiment, the shipper access terminal 32 is linked to a magnetic stripe card reader. The card reader accepts a card and transmits the data contained therein to the data processing device 34 of the shipper access terminal 32. The magnetic stripe card reader accepts an identification card from a user of the system. The identification card contains relevant user information. In an alternative application, the access terminal 32 is linked to a bar code reader which is designed to receive information from a bar code and input the bar code information into the data processing device 34. The bar code is printed on the BOL or on a carrier identification card.

The data processing device 34 sends 318 the transaction information to the central processor 40. The design of the central processor 40 is dictated by the desired speed, the number of users, and the amount of data to be processed.

Figure 4:
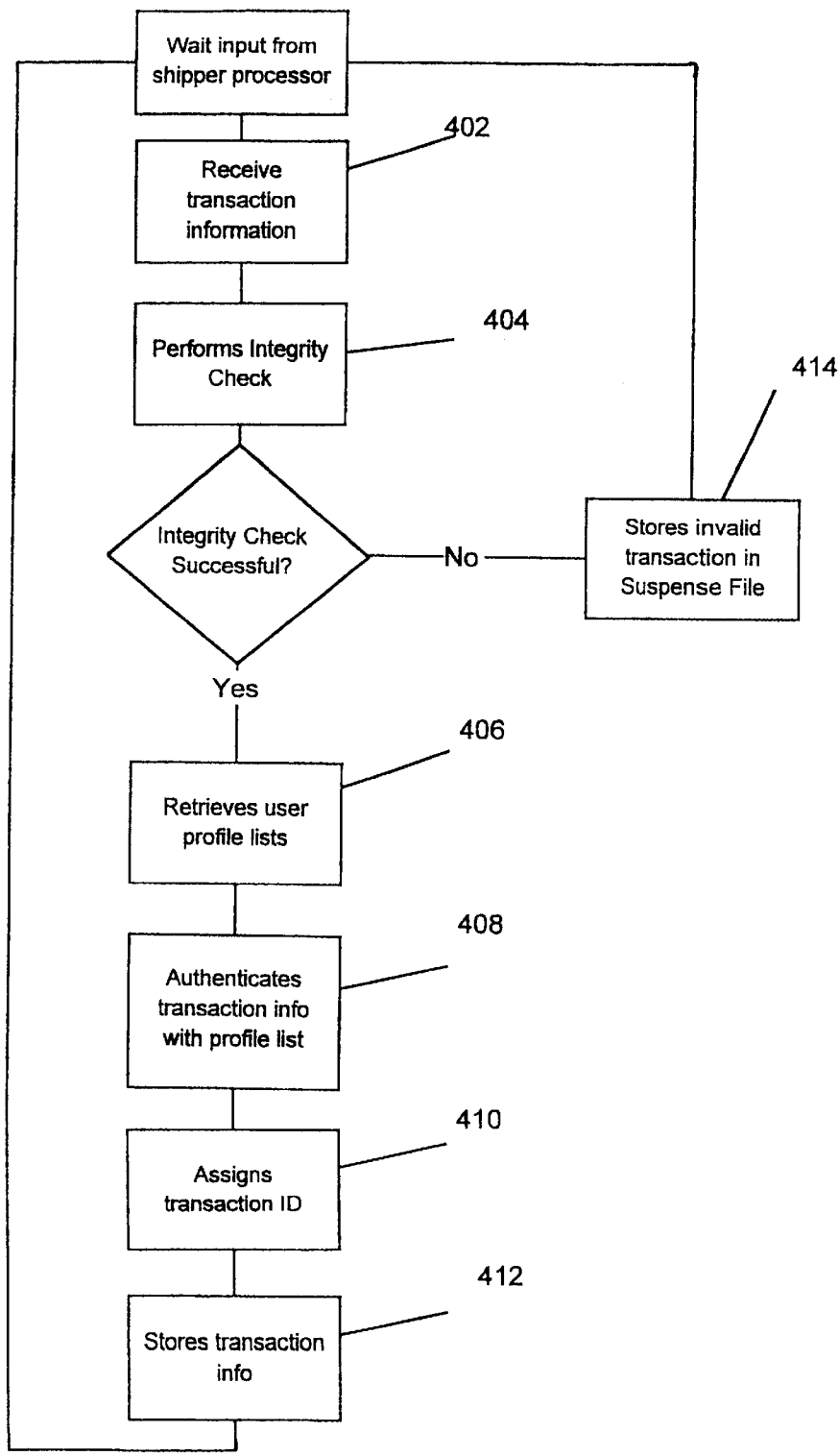
FIG. 4 is a block diagram illustrating an example flowchart for programming the central processor 40 of FIG. 1 manipulating the transaction information according to the present invention.

FIG. 4 is a block diagram illustrating an example flowchart for programming the central processor 40 of FIG. 1 to manipulate the transaction information according to the present invention. The central processor 40 receives 402 the transaction information and performs 404 an integrity check on the incoming information to ensure that the information is correctly formatted and contains no errors. If the integrity check is unsuccessful, the transaction information is stored in a suspense file in a data storage unit 42. Once the error is corrected, the corrected transaction may be sent into the normal process flow. If the integrity check is successful, the central processor 40 retrieves 406 authorized user profile lists from the data storage unit 42.

The data storage unit 42 is essentially a memory unit which stores information relevant to the shipping transaction. The design of the data storage unit 42 is dictated by the amount of data needed to be stored.

The authorized user profile lists represent the users and combination of users that are authorized to use the system. Authorized user profile lists include a shipper profile list, a carrier profile list, a carrier/shipper profile list, and a shipper access terminal profile list. The profile lists provide the cross reference between the payment ID (assigned by central processor 40), an account ID (assigned by an issuing processor 45), and a merchant number (assigned by a paying processor 54).

An authorized shipper profile list identifies information regarding the shipper and the shipment as can be seen below in Table 2.

TABLE 2

Shipper Profile

| DATA ELEMENT | WIDTH | TYPE | DESCRIPTION |
| --- | --- | --- | --- |
| Shipper ID | 10 | N | Uniquely identifies a legal entity using a single BOL system, assigned by the CP 40. |
| Account ID | 16 | N | Account # assigned to shipper 20 by issuing processor 54. |
| Shipper Name | 32 | A/N | |
| Shipper Address 1 | 32 | A/N | Headquarters Address |
| Shipper Address 2 | 32 | A/N | |
| Shipper City | 28 | A/N | |
| Shipper State/Province | 3 | A/N | |
| Shipper Country | 3 | A/N | |
| Shipper Contact | 32 | A/N | |
| Shipper Phone | 10 | N | |
| Open Date | 8 | N | Supplied by CP 40 when record is built. YYYYMMDD format |
| Date of First Activity | 8 | N | Automatically supplied by CP 40 when first BOL record is received by CP 40 - YYYYMMDD format |
| Date of Last Activity | 8 | N | Automatically updated by CP 40 every time a BOL record is processed |
| Current Status | 4 | A | Valid values are OPEN, CLSD, HOLD. Automatically updated on effective date if effective date was pre-entered or as part of on-line transaction when effective date is set to today. |
| Current Status Date | 8 | N | Automatically updated by system when current status field is updated, YYYYMMDD format |
| Pending Status | 4 | A | User will key status, valid values are OPEN, CLSD, HOLD |
| Effective Date | 8 | N | Default to today's date with user ability to override to a future date. YYYYMMDD format |
| Last update date | 8 | N | Automatically stamped by CP 40 |
| Last update time | 4 | N | Automatically stamped by CP 40. HHMM format |
| Last Update User | 8 | A/N | Automatically pulled from user profile by CP 40. |

An authorized carrier profile list identifies information regarding the carrier 22 and the shipment transaction as can be seen below in table 3. Included in the carrier profile is a merchant number which a paying processor 54 assigns to the carrier 22. Each carrier 22 can have multiple merchant numbers if desired. This allows carrier flexibility to assign different merchant numbers for different regions or different shippers. This flexibility facilitates the carrier's business management process. It is not known of existing systems which provide such flexibility.

TABLE 3

Carrier Profile

| COLUMN NAME | DATA WIDTH | DATA TYPE | DESCRIPTION |
| --- | --- | --- | --- |
| SCAC | 4 | A/N | 4 character code that uniquely identifies a Carrier 22. |
| Merchant Number | 10 | N | Paying processor 54 assigns to each carrier. |
| Carrier 22 Name | 32 | A/N | DBA name of Carrier HQ |
| Carrier Address 1 | 32 | A/N | |
| Carrier Address 2 | 32 | A/N | |
| Carrier City | 28 | A/N | |

TABLE 3-continued

Carrier Profile

| COLUMN NAME | DATA WIDTH | DATA TYPE | DESCRIPTION |
|---|---|---|---|
| Carrier State/Province | 3 | A/N | |
| Carrier Country | 3 | A/N | |
| Carrier Contact | 32 | A/N | Name of primary contact at Carrier HQ |
| Carrier Phone | 10 | N | Phone number of primary contact at Carrier HQ |
| Open Date | 8 | N | Automatically supplied by CP 40 when record is built. YYYYMMDD format |
| Date of First Activity | 8 | N | Automatically supplied by CP 40 when first BOL record is received by system on this Carrier 22 - YYYYMMDD format |
| Date of Last Activity | 8 | N | Automatically updated by system every time a BOL record is processed for this Carrier 22 |
| Current Status | 4 | A | Valid values are OPEN, CLSD, HOLD. Automatically updated on effective date if effective date was pre-entered or as part of on-line transaction when effective date is set to today. |
| Current Status Date | 8 | N | Automatically updated by CP 40 when current status field is updated, YYYYMMDD format |
| Pending Status | 4 | A | User will key status |
| Effective Date | 8 | N | Default to today's date with user ability to override to a future date. YYYYMMDD format |
| Last update date | 8 | N | Automatically stamped by CP 40 |
| Last update time | 4 | N | Automatically stamped by CP 40 HHMM format |
| Last Update User | 8 | A/N | Automatically pulled from user profile lists by CP 40 |

An authorized shipper/carrier profile list identifies information regarding valid shipper carrier combinations as can be seen below in table 4

TABLE 4

Shipper/Carrier Profile

| COLUMN NAME | DATA WIDTH | DATA TYPE | DESCRIPTION |
|---|---|---|---|
| Shipper ID | 10 | N | |
| Carrier SCAC | 4 | A/N | |
| Merchant Number | 10 | N | Assigned by Paying processor 54. If blank, use default value from carrier profile. |
| Proof of Delivery (POD) | 1 | A | "Y" for POD to be required, "N" for POD not required |
| Type of POD | 4 | A | Identifies in what manner the POD is to be received. |
| Auto close days | 2 | N | Number of days after which the transaction will close and be paid to the Carrier 22 regardless of whether or not POD has been posted. |
| Open Date | 8 | N | Automatically supplied by CP 40 when record is built. YYYYMMDD format |
| Date of First Activity | 8 | N | Automatically supplied by CP 40 when first BOL record is received by system - YYYYMMDD format |

TABLE 4-continued

Shipper/Carrier Profile

| COLUMN NAME | DATA WIDTH | DATA TYPE | DESCRIPTION |
|---|---|---|---|
| Date of Last Activity | 8 | N | Automatically updated by CP 40 every time a BOL record is processed |
| Current Status | 4 | A | Valid values are OPEN, CLSD, HOLD. Automatically updated on effective date if effective date was pre-entered or as part of on-line transaction when effective date is set to today. |
| Current Status Date | 8 | N | Automatically updated by CP 40 when current status field is updated, YYYYMMDD format |
| Pending Status | 4 | A | User will key status |
| Effective Date | 8 | N | Default to today's date with user ability to override to a future date. YYYYMMDD format |
| Last update date | 8 | N | Automatically stamped by CP 40 |
| Last update time | 4 | N | Automatically stamped by CP 40 HHMM format |
| Last Update User | 8 | A/N | Automatically pulled from user profile lists |

An authorized shipper access terminal profile identifies the shipper 20 as well as the shipping dock. A shipper has a separate shipper access terminal profile for each dock. The central processor 40 assigns a different dock ID for each dock. The information included in the access point profile is listed below in table 5

TABLE 5

Access Terminal Profile

| COLUMN NAME | WIDTH | TYPE | DESCRIPTION |
|---|---|---|---|
| Shipper ID | 10 | N | Uniquely identifies a legal entity using a single BOL system |
| Dock ID | 3 | N | Uniquely identifies a particular physical dock location with a shipper ID. |
| Account ID | 16 | N | Issuing Processor 54 assigns. Defaults from shipper profile, can be overridden by shipper. |
| Dock Name | 32 | A/N | DBA name of dock originating BOL |
| Dock Address 1 | 32 | A/N | Street address of dock originating BOL |
| Dock Address 2 | 32 | A/N | |
| Dock City | 28 | A/N | |
| Dock State/Province | 3 | A/N | |
| Dock Country | 3 | A/N | |
| Dock Contact | 32 | A/N | |
| Dock Phone | 10 | N | To be used for reporting against completion transaction |
| Open Date | 8 | N | Automatically supplied by CP 40 when record is built. YYYYMMDD format |
| Date of First Activity | 8 | N | Automatically supplied by CP 40 when first BOL record is received by system - YYYYMMDD format |
| Date of Last Activity | 8 | N | Automatically updated by CP 40 every time a BOL record is processed |
| Current Status | 4 | A | Automatically updated by CP 40 on the effective date if effective date was pre-entered or as part of the on-line transaction if the effective date is changed |

TABLE 5-continued

Access Terminal Profile

| COLUMN NAME | WIDTH | TYPE | DESCRIPTION |
|---|---|---|---|
| | | | to today. Valid values are OPEN, CLSD, HOLD |
| Current Status Date | 6 | N | Automatically updated by CP 40 when current status field is updated, YYYYMMDD format |
| Pending Status | 4 | A | User will key status |
| Effective Date | 8 | N | Default to today's date with user ability to override to a future date. YYYYMMDD format |
| Last update date | 8 | N | Automatically stamped by CP 40 |
| Last update time | 4 | N | Automatically stamped by CP 40 HHMM format |
| Last Update User | 8 | A/N | Automatically pulled from user profile lists |

The central processor 40 authenticates 408 the transaction information by comparing elements of transaction information with the authorized user profile lists. The elements of the transaction information used for authentication include; the identity of the shipper, the identity of the shipper's dock, and the identity of the carrier. If the authentication is successful, the central processor 40 assigns 410 a payment identification number (payment ID) to the transaction information and stores 412 the transaction information in the data storage unit 42. The payment ID is a unique key for the transaction record which the central processor 40 uses to centrally track the transaction. The payment ID includes specific information regarding the shipment transaction including; the shipper identification number, the BOL number, and the shipping date. The advantage of the payment ID is that it allows the central processor 40 to more efficiently and accurately track the different actions occurring within the system. The payment ID can be referenced to the specific identification numbers which any of the users may assign. The payment ID is now considered "open". Open is a term used to signify that the shipper 20 has transferred the goods to the carrier 22, and the carrier 22 has not yet completed the shipment.

If the authentication is unsuccessful, the central processor 40 stores 414 the invalid transaction in a suspense file in the data storage unit 42. When an invalid transaction is stored, a notification is sent which indicates that an error has occurred and is in need of further review and correction. Once the error is corrected, the corrected transaction may be sent into the normal process path.

Figure 5:
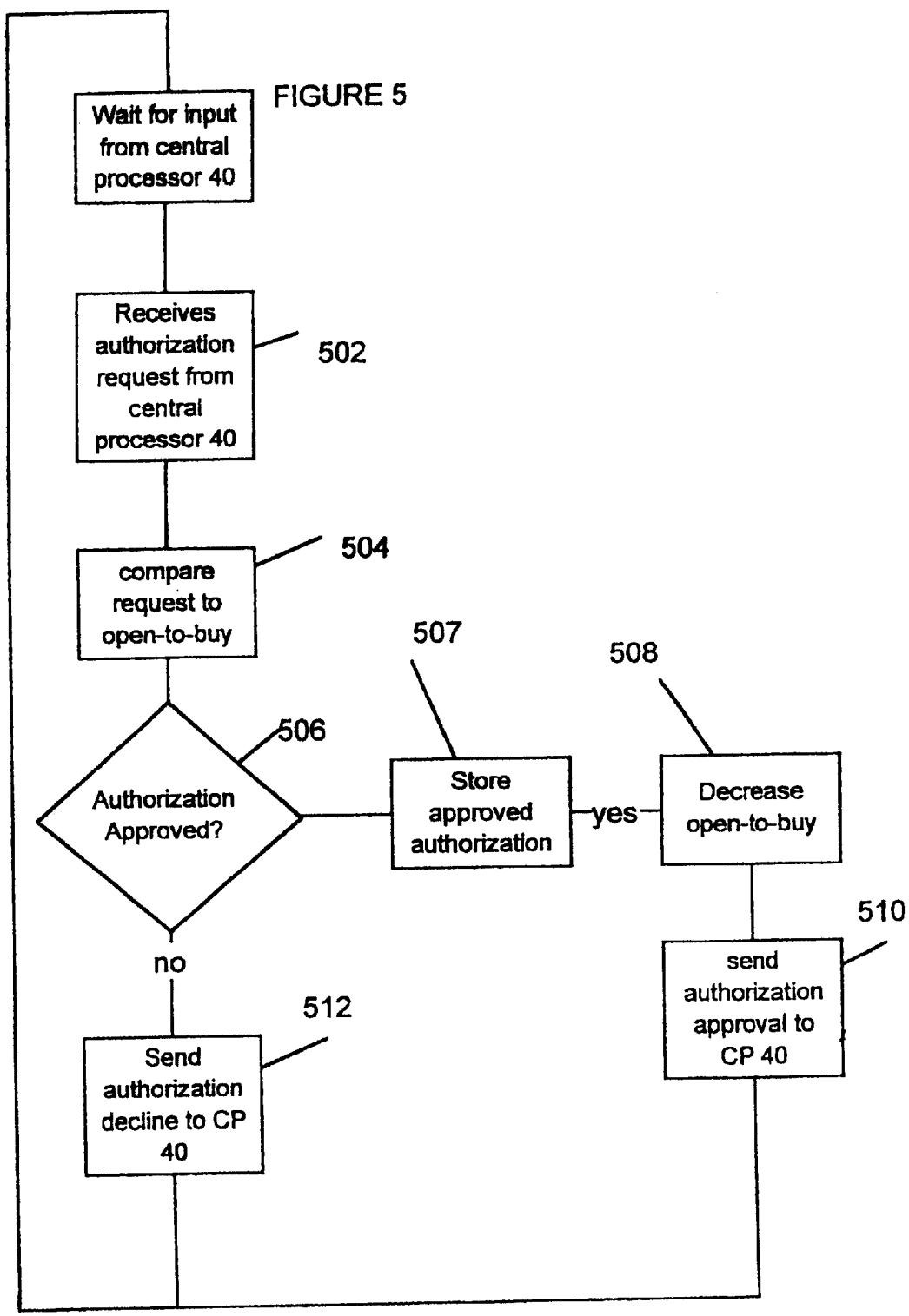
FIG. 5 is a block diagram illustrating an example flowchart for programming the issuing processor 45 of FIG. 1 authorizing a transaction according to the present invention.

The central processor 40 sends the authenticated transaction information, including the shipper identity and the cost of the shipment, to an issuing institution 44 for authorization. FIG. 5 is a block diagram illustrating an example flowchart for programming the issuing processor 45 of FIG. 1 to perform an authorization check according to the present invention. The issuing institution 44 contains an issuing processor 45. The issuing processor 45 maintains accounts for one or more shippers. Each account includes information regarding credit limits, open authorizations, unpaid balances, and the resulting open-to-buy. Open-to-buy measures the unused credit limit.

The issuing processor 45 receives 502 the authorization request from the central processor 40. The issuing processor 45 compares 504 the authorization request to the open-to-buy of the shipper and attempts to approve 506 the request. If the shipper 20 has enough open to buy, the issuing processor 45 approves the authorization request. The issuing processor 45 stores 507 the approved authorization request and decreases 508 the open-to-buy. The issuing processor 45 sends 510 the authorization approval to the central processor 40 and the central processor 40 updates the records in the data storage unit 42. If the authorization is successful, the payment ID is considered "authorized". If the authorization is unsuccessful, the issuing processor 45 sends 512 an authorization decline to the central processor 40.

After the goods are delivered to a receiver, the payment ID must be "closed". Closed refers to providing proof of delivery (POD) of the shipment in order to complete the shipment transaction. POD includes the identity of the shipper, the BOL number, the carrier invoice number, the delivery date and time, the person acknowledging receipt, and the condition of the shipment. A carrier processor 46 receives the POD and sends the information to the central processor 40.

In one embodiment, the carrier processor 46 is a conventional bar code reader. The bar code reader is used by the carrier 22 to read a bar code on the shipment. The bar code reader sends the POD information to the central processor 40.

Figure 6:
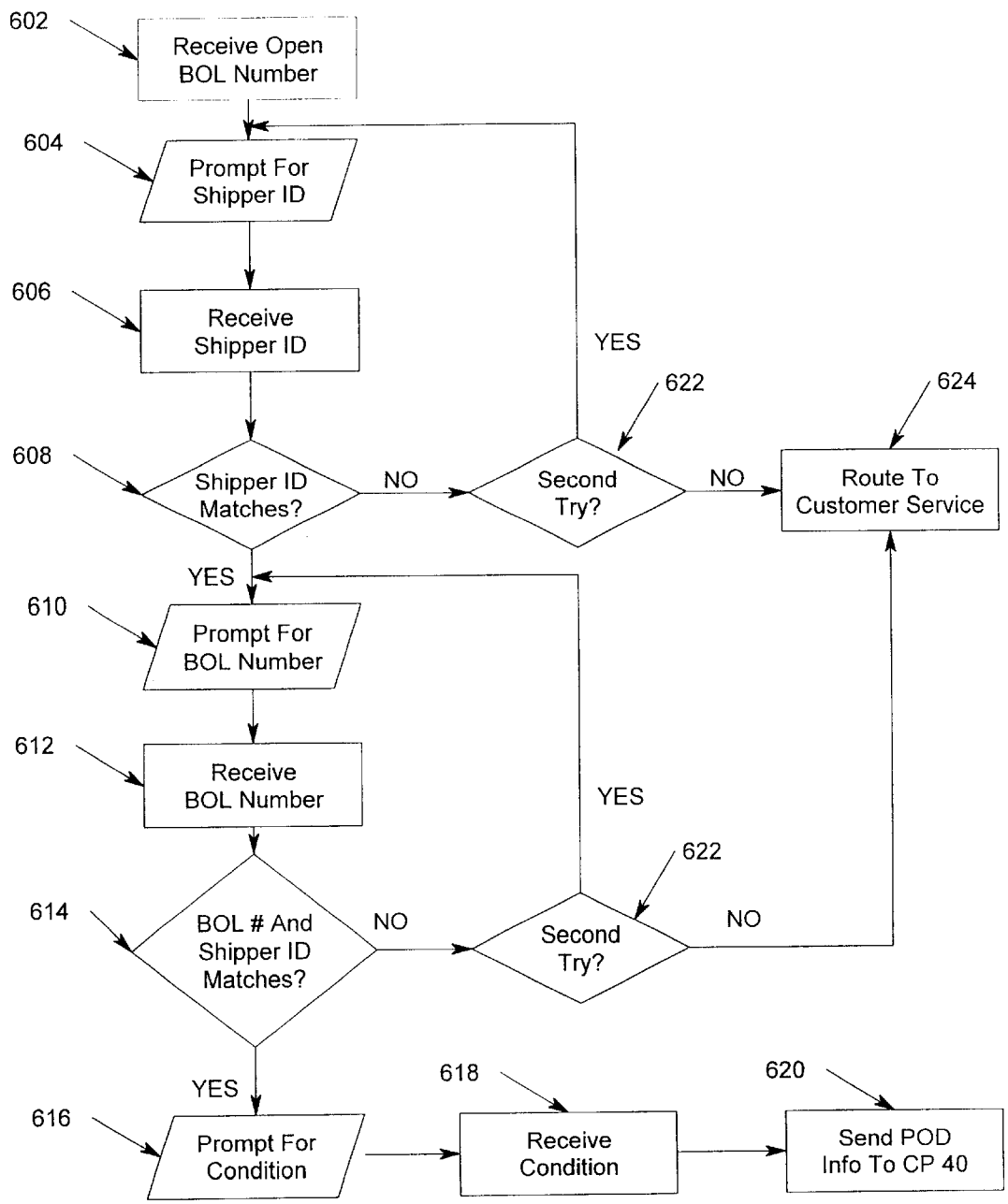
FIG. 6 is a block diagram illustrating an example flowchart for programming the VRU unit 48 according to the present invention.

In an alternative embodiment, the carrier processor 46 is a voice response unit 48 (VRU). FIG. 6 is a block diagram illustrating an example flowchart for programming the VRU 48 according one embodiment of the present invention. In this embodiment, the central processor 40 extracts an open payment ID from the data storage unit 42. The central processor 40 sends information relating to the open payment ID, including the BOL number and the shipper ID, to the VRU 48. The VRU 48 receives 602 the open BOL number.

A standard touch-tone telephone is used to access the VRU 48. While the location of the telephone is not critical, locating it at the receiver's premises promotes efficiency, convenience, and accuracy. It is convenient and efficient because the carrier 22 can call the VRU 48 at the exact time the shipment is delivered. It is accurate in that the phone number of the receiver, automatically captured by the VRU 48, will identify where and when the call was made.

The VRU 48 prompts 604 the carrier 22 for the shipper ID. The VRU 48 receives 606 the shipper ID and attempts to match 608 the entered shipper ID with a open shipper ID. If the shipper ID is matched, the VRU 48 prompts 610 the carrier 22 for the BOL number. The VRU 48 receives 612 the entered BOL number and attempts to match 614 the combination of the entered BOL number and shipper ID with an open BOL number and Shipper ID. If the BOL number and shipper ID combination is matched, the VRU 48 prompts 616 the carrier 22 for condition of shipment. The VRU 48 receives 618 the condition of shipment and sends 620 the POD information which includes BOL number, the shipper ID, and the condition of the shipment to the central processor 40.

If the VRU 48 cannot match either the shipper ID and the BOL number, the VRU 48 prompts 622 the carrier 22 to either try again or routes 624 the carrier 22 to customer service where the problem can be resolved.

Figure 7:
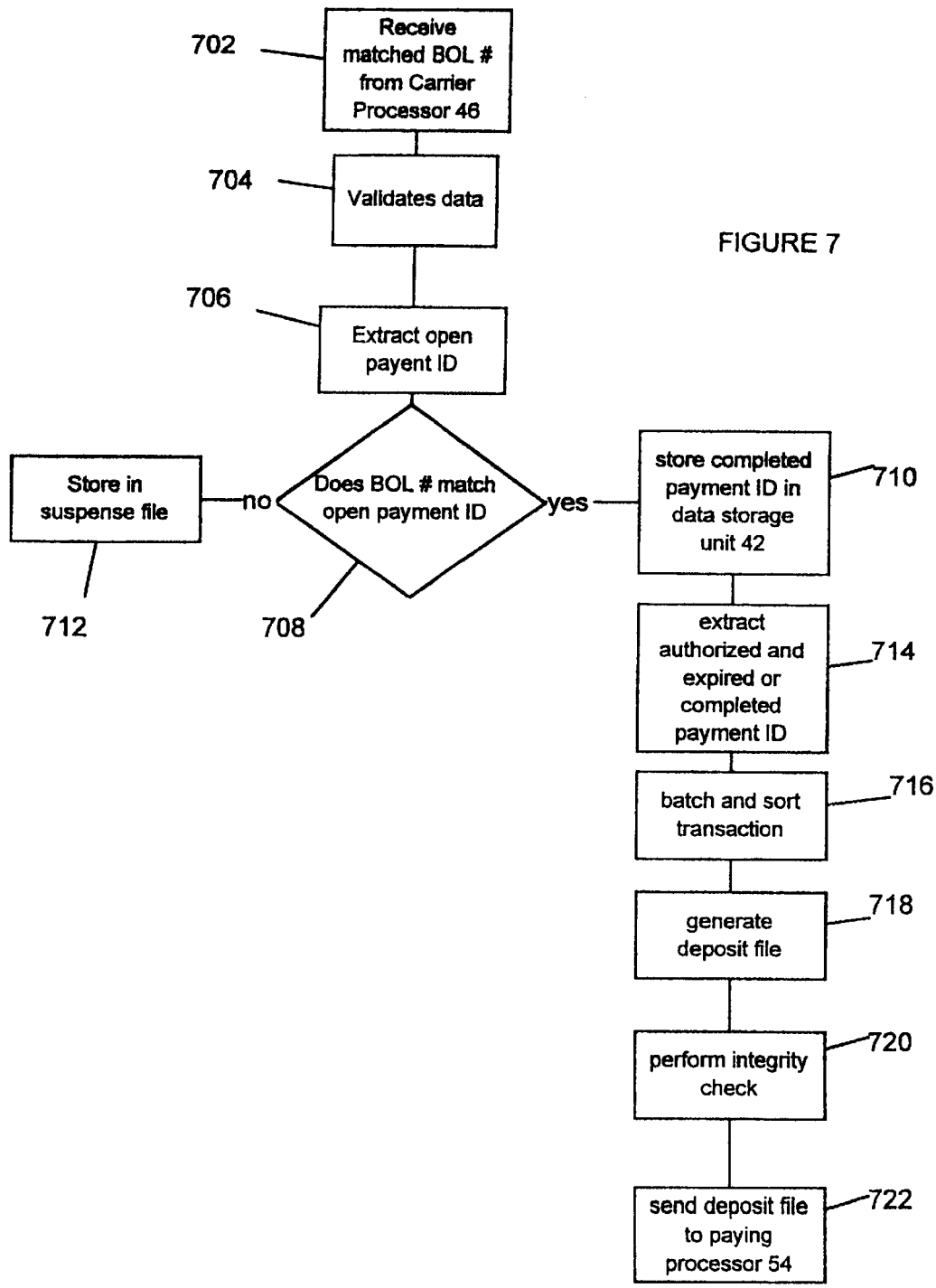
FIG. 7 is a block diagram illustrating an example flowchart for programming the central processor 40 of FIG. 1 generating a deposit file according to the present invention.

FIG. 7 is a block diagram illustrating an example flowchart for programming the central processor 40 of FIG. 1 generating a deposit file according to the present invention. The central processor 40 receives 702 the matched BOL number, the shipper ID, and the condition of the shipment from the carrier processor 46. The central processor 40 validates 704 the incoming data to ensure that it is error free and properly formatted. The central processor 40 extracts 706 the open payment ID from the data storage unit 42. The central processor 40 authenticates 708 the matched BOL number with an open payment ID. If the BOL number and payment ID are authenticated, the payment ID is considered complete. The central processor stores 710 the completed transaction and corresponding payment ID in the data storage unit 42. If authentication is unsuccessful, the central processor 40 stores 712 the information in a suspense file where the problem can be manually resolved as discussed above.

A payment ID can be completed by the above manner, or a payment ID can expire. A payment ID expires when a pre-programmed number of days has elapsed since the shipping date. This preprogrammed number of days is defined as auto close days in the data storage unit 42. A particular transaction is identified by the shipper and carrier to expire on a specific date, the effective date, whether or not the proof of delivery is received. On the effective date, the payment process begins. This has the advantage that the carrier 22 will be paid for every shipment carried. Payment to the carrier 22 is expedited if proof of delivery is received.

The central processor 40 periodically extracts 714 from the data storage unit 42 the transactions that are listed as "completed and authorized" or "expired and authorized." The central processor 40 sorts and batches 716 the transactions by the merchant number. The central processor 40 generates 718 a deposit file 50 for those authorized transactions which are completed or expired and which have not been previously extracted. In a particular application, one deposit file 50 is created for all transactions completed by each carrier. The deposit file 50 is formatted so that it is compatible with the paying processor's 54 format. The deposit file 50 includes the payment ID, the account ID, the carrier identity, the BOL number, the destination city, the destination state, the destination zip code, and the cost of shipment. The cost of the shipment represents the amount that is owed by the shipper 20 and payable to the carrier 22.

The central processor 40 performs 720 a general integrity check on the deposit file 50. The integrity check includes: ensuring that the payment ID has been authorized, ensuring that the BOL is completed or expired, and ensuring that payment has not yet occurred for the particular payment ID.

If the central processor 40 validates the deposit file 50, the processor 40 sends 722 the deposit file 50 to a paying processor 54 of a a paying institution 52. In a particular application, the deposit file 50 is conventionally sent via a telephone transmission. The paying institution has a paying processor 54 which processes financial information and maintains financial accounts for the carrier 22. The paying processor 54 is generally designed to process financial information. The paying institution 52 maintains one or more accounts for each carrier 22.

Figure 8:
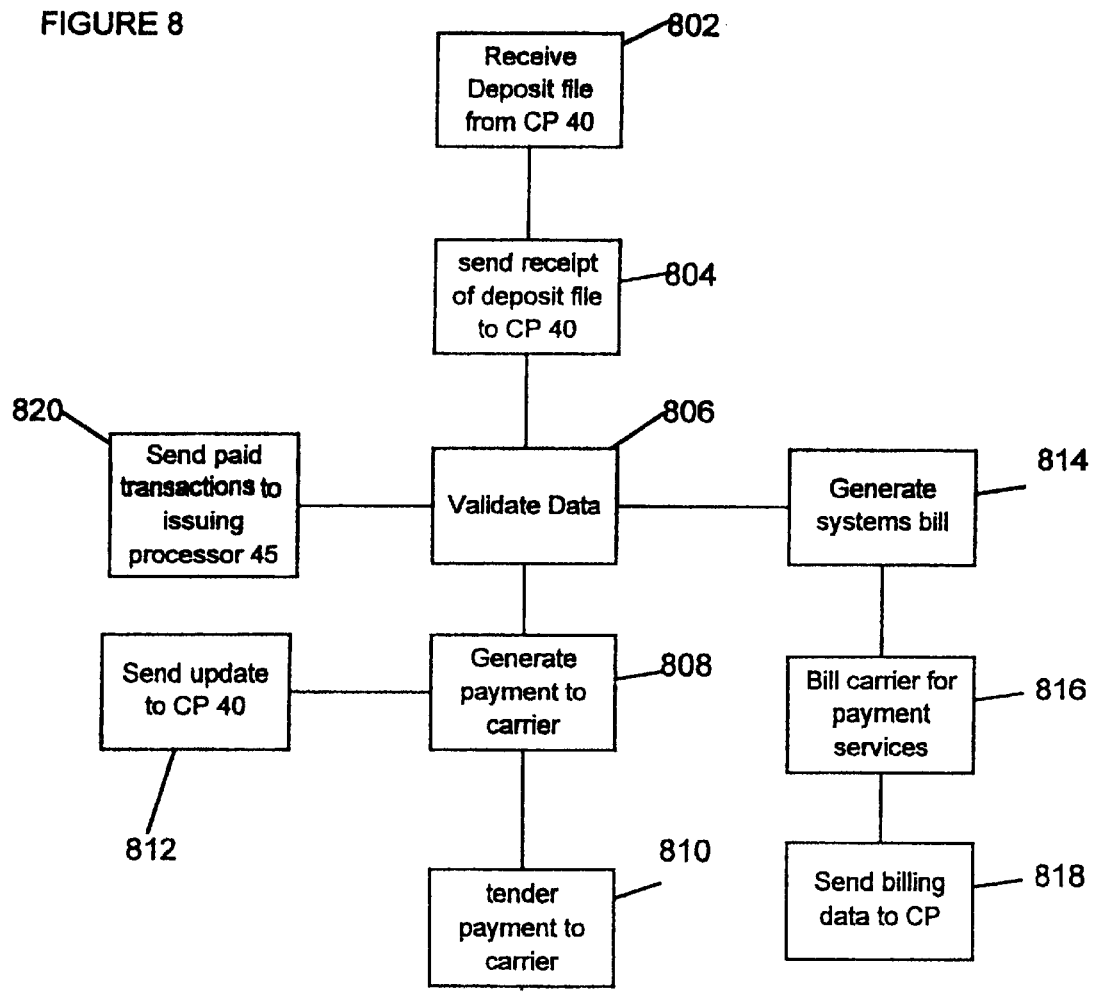
FIG. 8 is a block diagram illustrating an example flowchart for programming the paying processor 54 of FIG. 1 according to the present invention.

FIG. 8 is a block diagram illustrating an example flowchart for programming the paying processor 54 of FIG. 1 according to the present invention. The paying processor 54 receives 802 the deposit file 50 and sends 804 a confirmation message to the central processor 40 that the deposit file 50 was received.

The paying processor 54 validates 806 the incoming deposit file and generates 808 payment to the carrier 22. The paying processor 54 tenders 810 payment to the carrier 24 and sends 812 this information to the central processor 40 so that the central processor 40 can update the data storage unit 42. In a particular application, the paying processor 54 tenders payment by directly paying the carrier 22. In an alternative embodiment, the paying processor 54 sends the payment to the carrier's bank conventionally through the Federal Reserve's Automated Clearing House.

One advantage associated with the generation of payments to the carrier 22 is that the carrier 22 is paid relatively soon after the carrier 22 has completed the shipment. This provides the carrier 22 with improved cash flow and reduces the carrier's working capital requirements. Another advantage is that the carrier 22 does not have to audit or rate the payment which saves time and money. This streamlined approach-reduces the carrier's administrative costs associated with processing a payment.

The paying processor 54 generates 814 a systems bill for the carrier 22. This systems bill represents the amount the carrier 22 owes for the service provided by the system of the present invention. The paying processor 54 sends 816 the systems bill to the carrier 22. The paying processor 54 sends 818 the systems bill information to the central processor 40 where the information is stored in the data storage unit 42. The paying processor 54 delivers 820 the paid shipment transactions to the issuing processor 45 of the issuing institution 44.

Figure 9:
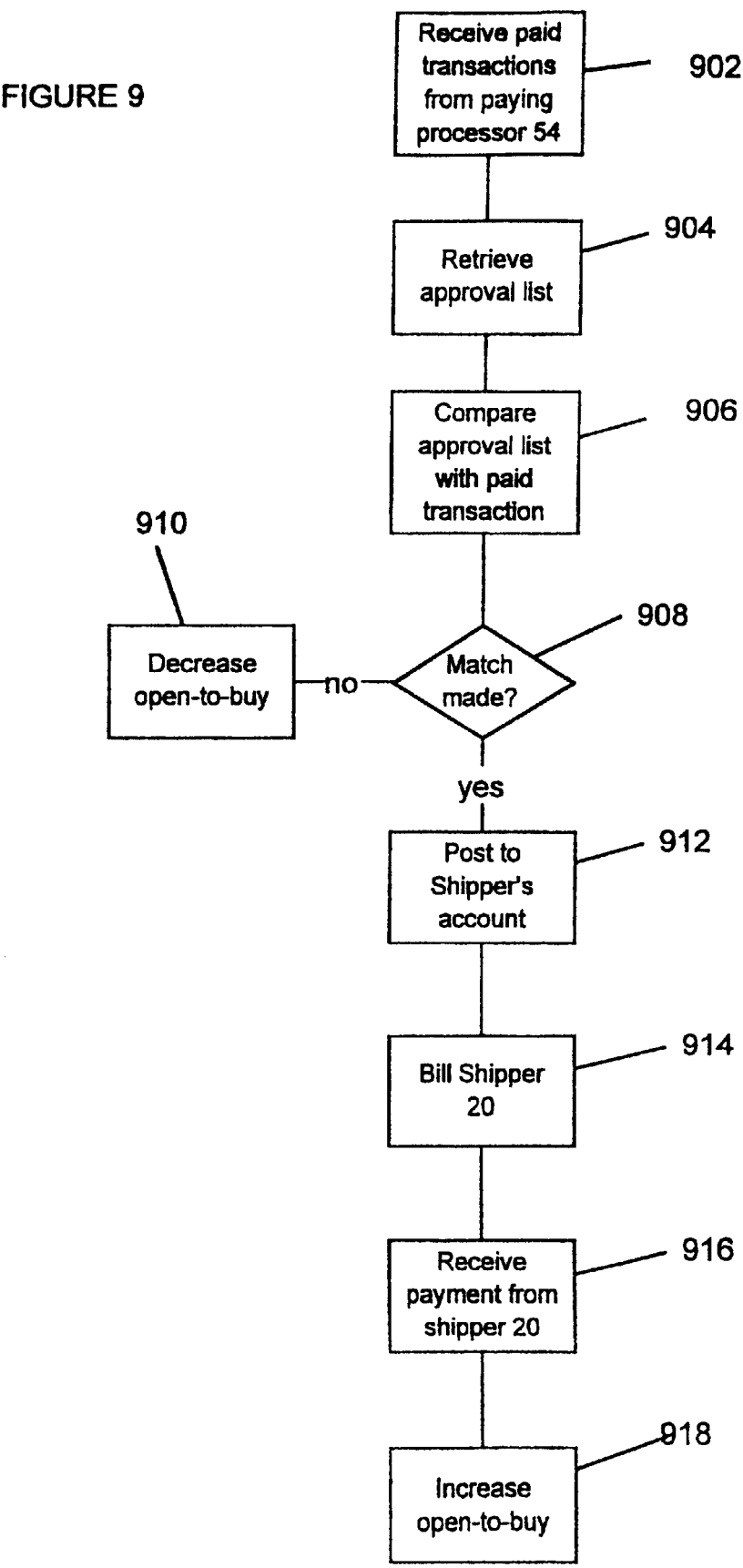
FIG. 9 is a block diagram illustrating an example flowchart for programming the issuing processor 45 of FIG. 1 crediting a transaction according to the present invention.

The issuing institution 44 maintains one or more accounts for the shipper 20 and extends and manages credit to the shipper 20. The issuing processor 45 maintains the amount paid to each carrier 22 on behalf of each shipper 20. FIG. 9 is a block diagram illustrating an example flowchart for programming the issuing processor 45 of FIG. 1 to credit a transaction according to the present invention. The issuing processor 45 receives 902 the paid transactions from the paying processor 54. The issuing processor 45 retrieves 904 the approved authorization list and compares 906 the authorization list with the paid transactions. The issuing processor 45 attempts to match 908 the paid transactions with an authorized transaction. If a match is made, no change is made to the open to buy. If a match is not made, the issuing processor 45 decreases 910 the open to buy.

The issuing processor 45 posts 912 the cost of shipment for all paid transactions to the shipper's account thereby increasing the balance due from the shipper 20. The issuing processor 45 periodically bills 914 the shipper 20 for the posted financial transactions paid on behalf of the shipper 20 and periodically receives 916 payment from the shipper 20. When the issuing processor 45 receives payment, the processor 45 posts payment to the shipper's account and increases 918 the open-to-buy.

The issuing processor 45 communicates with the central processor 40 and sends information regarding shipper 20 payment and billing. The central processor 40 updates the data storage unit 42 with this information.

In an alternative embodiment, the paying institution 52 is incorporated into the issuing institution 44. This results in one processor performing the functions of the issuing processor 45 and the paying processor 54.

A further advantage of the computer processing system for a shipment transaction involving a shipper and a carrier is that the data storage unit 42 and central processor 40 interface to store and provide value-laden information to the users of the system. The central processor 40 provides a security check for all information entering and leaving the data storage unit 42. The central processor edits incoming files and provides on-line alarms for duplicate files, stale dated files, out of balance files, and files with corrupt data. The central processor 40 maintains a suspense file in the data storage unit 42 where incoming invalid transaction information and unmatched proof of delivery information are stored. With a centrally located suspense file, the problem resolution process is more efficient.

The central processor 40 maintains data views and tables and stores this information in the data storage unit 42. The central processor 40 maintains a BOL Header Table for each BOL number which generally includes a summary of all information relating to that shipment transaction. This information is shown in the table 6 below. The source of the particular data element is indicated in column four of table 6.

TABLE 6

BOL Header Data Elements

| Data Element | Length | Type | Source | Purpose |
|---|---|---|---|---|
| Shipper ID | 10 | N | CP 40 | Record ID |
| Dock ID | 3 | N | CP 40 | Record ID |
| Account ID | 16 | N | CP 40 | Record ID; reporting |
| Bill of Lading # | 15 | AN | Shipper | Record ID |
| Ship Date | 8 | N | Shipper | Record ID, reporting |
| SCAC | 4 | A | Shipper | Alternate index, identifies Carrier |
| Merchant # | 10 | N | CP 40 | Alternate index, for CP 40 usage |
| Vendor # | 10 | N | Shipper | Alternate index, allows Shipper to specify its vendor number for a given carrier |
| Customer Number | 10 | N | Shipper | Alternate index, allows Shipper to specify it's customer number for a given receiver |
| Customer PO # | 15 | AN | Shipper | Alternate index, reporting |
| Shipper Order # | 15 | AN | Shipper | Alternative Index |
| Vendor Order Number | 15 | AN | Shipper | Reporting, alternate locator |
| Shipper Name | 35 | AN | Shipper | Reporting |
| Shipper Contact Person | 20 | A | Shipper | Claims |
| Shipper Phone # | 15 | AN | Shipper | Claims |
| Origin Designator | 10 | AN | Shipper | Reporting |
| City | 20 | AN | Shipper | reporting |
| State | 2 | A | Shipper | reporting |
| ZIP Code | 9 | N | Shipper | reporting |
| Division Code | 2 | AN | Shipper | reporting |
| Reference B/L #1 | 15 | AN | Shipper | Consolidated Shipments |
| Reference B/L #2 | 15 | AN | Shipper | Consolidated Shipments |
| Reference B/L #3 | 15 | AN | Shipper | Consolidated Shipments |
| Bill of Lading Type | 1 | AN | Shipper | Reporting |
| Shipment Mode | 3 | AN | Shipper | LTL, TL, RAI, AIR. |
| Inbound, Outbound Flag | 1 | AN | Shipper | reporting |
| Prepaid, Collect Flag | 1 | AN | Shipper | reporting |
| COD Flag | 1 | AN | Shipper | reporting |
| COD Amount | 9.2 | AN | Shipper | reporting |
| Shipment Value | 9.2 | AN | Shipper | reporting; claims |
| Driver Name | 20 | AN | Shipper | Reporting; Claims |
| Trailer/Car # | 15 | AN | Shipper | reporting; claims |
| Trailer/Car Seal # | 15 | AN | Shipper | reporting; claims |
| Import, Export Flag | 1 | AN | Shipper | reporting |
| # Stops | 2 | N | Shipper | reporting |
| Stop Off Charges | 7.2 | AN | Shipper | reporting |
| Rated Freight Charges | 9.2 | AN | Shipper | payment, reporting |
| Cube Dimensions | 5 | N | Shipper | reporting |
| Shipment "as weight" | 7.2 | N | Shipper | reporting; claims |
| Accessorial Charges | 7.2 | AN | Shipper | payment, reporting |
| Total Freight Charges | 9.2 | AN | Shipper | payment, reporting |
| Destination Name | 25 | AN | Shipper | reporting |
| Destination City | 20 | AN | Shipper | reporting |
| Destination State | 2 | A | Shipper | reporting |
| Destination Zip Code | 9 | N | Shipper | reporting |

TABLE 6-continued

BOL Header Data Elements

| Data Element | Length | Type | Source | Purpose |
|---|---|---|---|---|
| Destination Area Code | 3 | N | Shipper | reporting, verification |
| Destination Prefix | 3 | N | Shipper | reporting, verification |
| Destination Phone | 4 | N | Shipper | reporting, verification |
| Mileage | 5 | N | Shipper | reporting |
| Voucher/Check # | 12 | AN | CP 40 | inquiry |
| Ship Date | 8 | N | Shipper | Life cycle tracking |
| CP 40 Receipt Date | 8 | N | CP 40 | Life cycle tracking |
| Storage Insert Date | 8 | N | CP 40 | Life cycle tracking |
| VRU Extract Date | 8 | N | CP 40 | Life cycle tracking |
| Authorization Date | 8 | N | CP 40 | Life cycle tracking |
| Authorization # | 6 | AN | Issuing Proc. 45 | From authorization response feed |
| Auth Response Code | 2 | AN | Issuing Proc. 45 | From authorization response feed |
| Delivery Date | 8 | N | CP 40 | Life cycle tracking |
| Completion Date | 8 | N | CP 40 | Life cycle tracking |
| Deposit Extract Date | 8 | N | CP 40 | Life cycle tracking |
| Settlement Date | 8 | N | Paying Proc. 54 | From Settlement record |
| Settlement DDA # | 12 | AN | Paying Proc. 54 | From Settlement record |
| Shipper Billing Date | 8 | N | Issuing Proc. 45 | From statement billing file feed for life cycle tracking |
| Delivery Area Code | 3 | N | Carrier Proc | POD tracking, claims |
| Delivery Prefix | 3 | N | Carrier Proc. 46 | POD tracking, claims |
| Delivery Phone | 4 | N | Carrier Proc. 46 | POD tracking, claims |
| Receiver Name | 20 | A | Carrier Proc. 46 | POD tracking, claims |
| Receipt Condition | 1 | A | Carrier Proc. 46 | Quality of service tracking, claims |
| POD ID | 15 | AN | Carrier Proc. 46 | Provided by carrier 22 (such as FedEx, UPS) who has accepted POD system |

In addition, the central processor 40 maintains BOL line item details from the transaction information. The BOL line item details generally consist of information relating to the goods of the shipment as can be seen below in table 7.

TABLE 7

BOL Line Item Detail Data Elements

| Data Element | Length | Type | Source | Purpose |
|---|---|---|---|---|
| Shipper ID | 16 | N | CP 40 | Record ID |
| Bill of Lading # | 15 | AN | Shipper | Record ID |
| Ship Date | 8 | N | Shipper | Record ID |
| Product Description | 28 | AN | Shipper | reporting, claims |
| Product ID | 8 | AN | Shipper | reporting, claims |
| Product Value | 7.2 | $N | Shipper | claims |
| Haz Mat Flag | 1 | AN | Shipper | reporting, claims |
| Item Weight | 7.2 | N | Shipper | reporting, claims |
| Total Pcs | 5 | N | Shipper | reporting, claims |
| Item "as weight" | 7.2 | N | Shipper | reporting |
| Unit of Measure | 4 | AN | Shipper | reporting, claims |
| Accounting Code | 25 | AN | Shipper | reporting |

TABLE 7-continued

BOL Line Item Detail Data Elements

| Data Element | Length | Type | Source | Purpose |
|---|---|---|---|---|
| Item Freight charges | 7.2 | N | Shipper | reporting, claims |

In the example system application of FIG. 1, the carrier 22 will not have access to the BOL line item product value, but will be able to see the line item freight charges.

A further advantage of the shipment transaction system of FIG. 1 is that the system allows multiple users to obtain information about the same shipment from the same source. Since the system supplies information from the same source, all users will obtain the same information at the same time. This advantage of timeliness does not exist in current systems. Existing systems are not known to provide a single source of up-to-date information regarding multiple shipment transactions.

In an alternative embodiment, multiple users access the shipment information via the central processor 40. The shipment information is stored in the data storage unit 42. The central processor 40 is electronically linked to a multitude of user stations. The link between the central processor 40 and a user station allows for conventional two-way communication. The user station is a standard personal computer comprising of a video display, a keyboard, a central processor, and a modem link. A user initiates a request for information by accessing the central processor 40 using the personal computer. When the user is logged into the central processor 40, the central processor 40 prompts the user to enter a password.

The central processor 40 provides a security check on all information requests. The security check is programmed such that the shipper 20 and carrier 22 are restricted to accessing only their own data. In addition, the processor 40 is programmed such that unauthorized parties are denied access.

The central processor 40 receives informational requests from the user. The central processor 40 accesses the data storage unit 42 and extracts the requested information and transmits the information to the user's station. The advantage of such an information service is clear. Users will be able to obtain current information regarding a shipment transaction.

In a particular application, once a user has access to the system, the central processor 40 will prompt the user for a range of dates of interest including the current day, the previous day, monthly total, yearly total, or a specified date range. The central processor 40 displays the transaction information, freight amounts, shipment costs, total weight, and cost per pound for various types of transactions including: transactions added to the data storage unit, transactions with proof of delivery, transactions that have expired, transactions in the suspense file, transactions paid to carrier, transactions in transit, transactions declined, and transactions approved.

The central processor 40 allows user's to request a particular transaction by entering any one of a multitude of transaction elements. The central processor 40 identifies a particular transaction with reference to the BOL number, the shipper's customer number for the receiver 22, the payment ID, the carrier's customer number for the shipper 20, the merchant number, the account ID, the receiver's order number for the shipper 20, the shipper's order number for the BOL number, or the shipping date. This ensures compatibility between the user reference numbers such that the user can access information using their unique reference number assigned to the transaction.

The example application has additional advantages. The central processor 40 provides to all authorized users the ability to generate custom analysis of their own data. This has the advantage of giving the carrier 22 the ability to extract payment data needed to automatically post his accounts receivable system. This is an advantage over existing systems which rely on manual distribution of payment against the account receivable system. Similarly, the shipper can extract payment data and automatically post his accounts payable which closes out the individual accounts payable due to each carrier. An advantage stemming from this automated system is that the shipper 20 does not need a paper invoice in order to have proof of delivery. The shipper 20 accesses the central processor 40 and verify which shipments have been delivered by a particular carrier 22. Similarly, the carrier 22 accesses the central processor 40 to find out which transactions have been paid out by the shipper 20. This informational system removes much uncertainty from the shipment process which promotes more efficient use of available resources such as working capital, transportation, and personnel.

In a particular application, the central processor 40 generates standard shipment transaction summary reports and provides appropriate access to the reports by various users. These reports include a transaction inventory control report, an open aging summary report, a suspense inventory control by source report, and a suspense inventory aging summary report. The central processor 40 uses the security profiles to determine which subset of transaction records will be summarized for each user. For example, the shipper 20 has access only to that shipper's reports.

The inventory control report provides control totals of BOL numbers, merchandise value, and freight value. There are key control points including: starting inventory position, new BOL's from shippers, BOL's closed since the last report by the different methods discussed for closing BOL numbers, BOL's re-opened since the last report by manual proof of delivery override via customer service, BOL's canceled since the last report, and the ending inventory position.

The open aging summary report contains those BOL numbers that have not been delivered. In addition, the freight value and merchandise value for each shipper ID and Dock ID are supplied for distinct age groups. The age groups include groupings by consecutive days since the shipping date and one group for 10 days past the shipping date. The suspense inventory control by source report includes merchandise and freight value amounts of transactions in the suspense file. Several control points for the suspense inventory control include: starting inventory position, new inventory added since last report, inventory cleared since last report, inventory deleted since last report, inventory undeleted since last report, and ending inventory position. The suspense inventory aging summary report provides an aged summary of suspense files including the merchandise and freight value of items that are in the suspense file by original receipt date.

The central processor 40 generates detailed reports including: the inventory aging detail report, the suspense inventory aging detail report, and the declined item aging detail report. The detail reports are viewed by either the shipper ID/Dock ID/account ID combination or by the carrier ID/merchant number combination. The inventory aging detail report lists the open BOL numbers sorted by the days in inventory, the shipper ID combination, and the BOL number. The inventory detail report lists the merchandise and freight value associated with each open BOL number. The suspense inventory aging detail report lists open BOL numbers by source and receipt date. Several fields are displayed including: shipper ID, dock ID, account ID, BOL number, carrier ID, freight value, and the merchandise value. The declined item aging detail report allows users to research the cause of exception items and lists the shipper ID combination, ship date, authorization time, BOL number, shipper invoice number, merchant number, and freight value. The declined item aging detail report is viewed by either shipper ID/dock ID/account ID combination, or by carrier ID/merchant number combination.

The central processor 40 generates two reports that reference declined authorizations. These reports include the declined item summary report and the declined item aging report. The declined item summary report summarizes information regarding the declined authorization. The declined item aging report summarizes the information regarding the declined authorization by the shipping date.

Accordingly, the present invention provides, among other aspects, a computer processing system for a shipment transaction involving a shipper and a carrier. Other aspects and embodiments of the present invention will be apparent to those skilled in the art from consideration of the specification and practice of the invention disclosed herein. It is intended that the specification and illustrated embodiments be considered as exemplary only, with a true scope and spirit of the invention being indicated by the following claims.

What is claimed is:

1. For shipment transaction processing involving transaction information related to goods shipped from one of a plurality of shippers by one of a plurality of carriers, a shipment transaction system comprising: a central processor arrangement programmed and configured to maintain data relating to an authorized profile list criterion that includes information about authorized users, and programmed and configured to process the transaction information by determining whether the transaction information satisfies the authorized profile list criterion, and using the authorized profile list criterion to generate information for auditing a transaction between said one of a plurality of shippers and said one of a plurality of carriers.

2. A shipment transaction system, according to claim 1, further including a computer arrangement that is programmed and configured to respond to shipment-related information from an external device by generating a set of transaction information.

3. A shipment transaction system, according to claim 2, further including means for informing the central processor arrangement of delivery of the goods by the carrier the central processor arrangement being responsive to the informing means and using the transaction information and the authorized profile list criterion to audit the shipment transaction and payment thereof.

4. A shipment transaction system, according to claim 1, wherein the central processor arrangement is further programmed and configured to update a previously-created authorized profile list criterion.

5. A shipment transaction processing involving transaction information related to goods shipped from one of a plurality of shippers by one of a plurality of carriers, a shipment transaction system comprising: a central processor arrangement programmed and configured to process the transaction information by storing an authorized profile list criterion that includes information about authorized users, by determining whether the transaction information satisfies the authorized profile list criterion, and by using the authorized profile list criterion to generate information for auditing a transaction between said one of a plurality of shippers and said one of a plurality of carriers.

6. A shipment transaction system, according to claim 5, further including means for informing the central processor arrangement of delivery of the goods by the carrier, the central processor arrangement being responsive to the informing means and using the transaction information and the authorized profile list criterion to audit the shipment transaction and payment thereof.

7. A shipment transaction system, according to claim 6, further including a computer arrangement that is programmed and configured to respond to shipment-related information from an external device by generating a set of transaction information.

8. A shipment transaction system, according to claim 7, wherein the central processor arrangement is further programmed and configured to update a previously-created authorized profile list criterion.

9. A shipment transaction system for processing transaction information related to goods shipped from one of a plurality of shippers by one of a plurality of carriers, the shipment transaction system comprising:

a computer arrangement that is programmed and configured to respond to shipment-related information from said one of the shipper by generating a set of transaction information that includes at least one transaction code to identify the transaction and the time at which the shipment is initiated at the shipper's premises; and a central processor arrangement located remote from the shipper's premises and programmed and configured to respond to the transaction information, maintain an authorized profile list criterion, and determine whether the transaction information satisfies the authorized profile list criterion, the central processor arrangement being responsive to a notification of delivery of the goods by the carrier and using the transaction information and the authorized profile list criterion to audit the shipment transaction.

10. For shipment transaction processing involving transaction information related to goods shipped from one of a plurality of shippers by one of a plurality of carriers, a shipment transaction system comprising:

means for storing an authorized profile list criterion that includes information about authorized users; and means for maintaining data relating to the authorized profile list criterion, and for processing the transaction information by determining whether the transaction information satisfies the authorized profile list criterion, and using the authorized profile list criterion to generate information for auditing a transaction between said one of a plurality of shippers and said one of a plurality of carriers.

11. For shipment transaction processing involving transaction information related to goods shipped from one of a plurality of shippers by one of a plurality of carriers, a shipment transaction system comprising:

means for storing an authorized profile list criterion that includes information about authorized users; and means for processing the transaction information by storing the authorized profile list criterion, by determining whether the transaction information satisfies the authorized profile list criterion, and by using the authorized profile list criterion to generate information for auditing a transaction between said one of a plurality of shippers and said one of a plurality of carriers.

12. A shipment transaction system for processing transaction information related to goods shipped from one of a plurality of shippers by one of a plurality of carriers, the shipment transaction system comprising:

a means for responding to shipment-related information from said one of the shipper by generating a set of transaction information that includes at least one transaction code to identify the transaction and the time at which the shipment is initiated at the shipper's premises; and a CPU means, located remote from the shipper's premises, for responding to the transaction information, for maintaining an authorized profile list criterion, and for determining whether the transaction information satisfies the authorized profile list criterion, the CPU means being responsive to a notification of delivery of the goods by the carrier and using the transaction information and the authorized profile list criterion to audit the shipment transaction.

13. For shipment transaction processing involving transaction information related to goods shipped from one of a plurality of shippers by one of a plurality of carriers, a method for monitoring a shipment transaction comprising:

providing an authorized profile list criterion that includes information about authorized users;

using a computer arrangement, maintaining data relating to the authorized profile list criterion and processing the transaction information by determining whether the transaction information satisfies the authorized profile list criterion, and by using the authorized profile list criterion to generate information for auditing a transaction between said one of a plurality of shippers and said one of a plurality of carriers.

14. A method for monitoring a shipment transaction, according to claim 13, further including sending shipment-related information from an external device and generating a set of transaction information therefrom.

15. A method for monitoring a shipment transaction, according to claim 14, further including informing the computer arrangement of delivery of the goods by the carrier, and using the computer arrangement to audit the shipment transaction and payment thereof in response to the transaction information and the authorized profile list criterion.

16. A method for monitoring a shipment transaction, according to claim 15, further including updating a previously-created authorized profile list criterion.

17. For shipment transaction processing involving transaction information related to goods shipped from one of a plurality of shippers by one of a plurality of carriers, a method for monitoring a shipment transaction comprising:

providing an authorized profile list criterion that includes information about authorized users;

using a computer arrangement, processing the transaction information by storing the authorized profile list criterion, by determining whether the transaction information satisfies the authorized profile list criterion, and by using the authorized profile list criterion to generate information for auditing a transaction between said one of a plurality of shippers and said one of a plurality of carriers.

18. A method for monitoring a shipment transaction, according to claim 17, further including sending shipment-related information from an external device and generating a set of transaction information therefrom.

19. A method for monitoring a shipment transaction, according to claim 18, further including informing the computer arrangement of delivery of the goods by the carrier, and using the computer arrangement to audit the shipment transaction and payment thereof in response to the transaction information and the authorized profile list criterion.

20. A method for monitoring a shipment transaction, according to claim 19 further including updating a previously-created authorized profile list criterion.

21. A method for monitoring a shipment transaction, according to claim 20, further including sending shipment-related information from an external device and generating a set of transaction information therefrom.

* * * * *

UNITED STATES PATENT AND TRADEMARK OFFICE
CERTIFICATE OF CORRECTION

PATENT NO. : 6,571,149 B1
DATED : May 27, 2003
INVENTOR(S) : Hahn-Carlson

It is certified that error appears in the above-identified patent and that said Letters Patent is hereby corrected as shown below:

Column 1,
Line 6, delete "application".
Line 33, "carrier" should read -- carrier's --.

Column 3,
Lines 13-14, delete "or every illustrated implementation,".

Column 4,
Line 12, "send" should read -- sends --.
Line 30, "carrier 24" should read -- carrier 22 --.

Column 5,
Line 56, "type is" should read -- Type is --.

Column 6,
Line 13, Table 1: "it's" should read -- its --.
Line 46, Table 1: "weight~" should read -- weight" --.

Column 9,
Line 42, "table 4" should read -- table 4. --.

Column 10,
Line 32, "table 5" should read -- table 5. --.

Column 11,
Line 8, Table 5: Width "6" should read -- Width -- 8 --.

Column 13,
Line 44, delete the second "a".

Column 15,
Line 24, Table 6: "it's" should read -- its --.

UNITED STATES PATENT AND TRADEMARK OFFICE
CERTIFICATE OF CORRECTION

PATENT NO. : 6,571,149 B1
DATED : May 27, 2003
INVENTOR(S) : Hahn-Carlson

It is certified that error appears in the above-identified patent and that said Letters Patent is hereby corrected as shown below:

Column 16,
Line 61, Table 7: "$N" should read -- AN --.

Column 17,
Line 61, "user's" should read -- users --.

Signed and Sealed this

Tenth Day of February, 2004

JON W. DUDAS
*Acting Director of the United States Patent and Trademark Office*